(12) United States Patent
Tripoli et al.

(10) Patent No.: US 10,885,108 B2
(45) Date of Patent: *Jan. 5, 2021

(54) MEDIA CONTENT SEARCH BASED ON METADATA

(71) Applicant: Sonos, Inc., Santa Barbara, CA (US)

(72) Inventors: Ben Tripoli, Santa Barbara, CA (US); Abhishek Kumar, Santa Barbara, CA (US)

(73) Assignee: SONOS, INC., Santa Barbara, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 15/999,511

(22) Filed: Aug. 20, 2018

(65) Prior Publication Data

US 2019/0005130 A1 Jan. 3, 2019

Related U.S. Application Data

(63) Continuation of application No. 13/693,540, filed on Dec. 4, 2012, now Pat. No. 10,055,491.

(51) Int. Cl.
*G06F 16/68* (2019.01)
*G06F 16/78* (2019.01)
(Continued)

(52) U.S. Cl.
CPC .............. *G06F 16/68* (2019.01); *G06F 16/78* (2019.01); *G06F 17/30864* (2013.01); *G06F 16/43* (2019.01); *G06F 16/951* (2019.01)

(58) Field of Classification Search
None
See application file for complete search history.

(56) References Cited

U.S. PATENT DOCUMENTS

| 5,440,644 A | 8/1995 | Farinelli et al. |
| 5,761,320 A | 6/1998 | Farinelli et al. |

(Continued)

FOREIGN PATENT DOCUMENTS

| EP | 1389853 A1 | 2/2004 |
| WO | 200153994 | 7/2001 |
| WO | 2003093950 A2 | 11/2003 |

OTHER PUBLICATIONS

Advisory Action dated Aug. 31, 2016, issued in connection with U.S. Appl. No. 13/693,540, filed Dec. 4, 2012, 9 pages.

(Continued)

*Primary Examiner* — Christopher J Raab
(74) *Attorney, Agent, or Firm* — McDonnell Boehnen Hulbert & Berghoff LLP

(57) ABSTRACT

Embodiments are provided for querying a media server for media content based on user-selected metadata associated with first media while the first media is being experienced by a user. In one embodiment, at least one metadata associated with the first media may be displayed for the user to review while the first media is being experienced by the user. The user may then select a displayed metadata to initiate a search for media content based on the selected metadata. The search for media content may be performed by querying a media server associated with a selection of media content services. The user may then review the results of the media query, select media content from the results, and initiate further action, such as adding the media content to a digital repository, or purchasing the media content.

20 Claims, 9 Drawing Sheets

(51) Int. Cl.
*G06F 17/30* (2006.01)
*G06F 16/43* (2019.01)
*G06F 16/951* (2019.01)

(56) References Cited

U.S. PATENT DOCUMENTS

| | | | |
|---|---|---|---|
| 5,848,410 A | 12/1998 | Walls et al. | |
| 5,859,638 A | 1/1999 | Coleman et al. | |
| 5,923,902 A | 7/1999 | Inagaki | |
| 6,025,838 A | 2/2000 | Bardon et al. | |
| 6,032,202 A | 2/2000 | Lea et al. | |
| 6,256,554 B1 | 7/2001 | DiLorenzo | |
| 6,288,718 B1 | 9/2001 | Laursen et al. | |
| 6,404,811 B1 | 6/2002 | Cvetko et al. | |
| 6,469,633 B1 | 10/2002 | Wachter et al. | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 6,971,069 B2 | 11/2005 | Laiho et al. | |
| 6,985,694 B1 | 1/2006 | De Bonet et al. | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank | |
| 7,305,624 B1 | 12/2007 | Siegel | |
| 7,343,384 B2 | 3/2008 | Plastina et al. | |
| 7,391,791 B2 | 6/2008 | Balassanian | |
| 7,483,538 B2 | 1/2009 | McCarty et al. | |
| 7,545,440 B2 | 6/2009 | Kim et al. | |
| 7,560,637 B1 | 7/2009 | Robbin et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,742,740 B2 | 6/2010 | Goldberg et al. | |
| 7,788,582 B2 | 8/2010 | Robbin et al. | |
| 7,853,341 B2 | 12/2010 | McCarty et al. | |
| 7,890,520 B2 | 2/2011 | Tsukazaki et al. | |
| 7,956,272 B2 | 6/2011 | Wysocki et al. | |
| 7,987,294 B2 | 7/2011 | Bryce et al. | |
| 8,014,423 B2 | 9/2011 | Thaler et al. | |
| 8,017,852 B2 | 9/2011 | Yamashita et al. | |
| 8,045,952 B2 | 10/2011 | Qureshey et al. | |
| 8,050,652 B2 | 11/2011 | Qureshey et al. | |
| 8,074,253 B1 | 12/2011 | Nathan | |
| 8,103,009 B2 | 1/2012 | McCarty et al. | |
| 8,112,032 B2 | 2/2012 | Ko et al. | |
| 8,234,395 B2 | 7/2012 | Millington et al. | |
| 8,276,076 B2 | 9/2012 | Torrens et al. | |
| 8,483,853 B1 | 7/2013 | Lambourne et al. | |
| 8,634,944 B2 | 1/2014 | Bull et al. | |
| 8,683,378 B2 | 3/2014 | Bull et al. | |
| 8,766,079 B2 | 7/2014 | Utsuki et al. | |
| 8,942,252 B2 | 1/2015 | Balassanian et al. | |
| 8,954,855 B2 | 2/2015 | Shirai et al. | |
| 8,977,963 B1 | 3/2015 | Joyce et al. | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2002/0147977 A1 | 10/2002 | Hammett et al. | |
| 2003/0013493 A1 | 1/2003 | Irimajiri et al. | |
| 2003/0014767 A1 | 1/2003 | Stumphauzer | |
| 2003/0157951 A1 | 8/2003 | Hasty | |
| 2004/0024478 A1 | 2/2004 | Hans et al. | |
| 2004/0113952 A1 | 6/2004 | Randall | |
| 2004/0252119 A1 | 12/2004 | Hunleth et al. | |
| 2005/0154988 A1 | 7/2005 | Proehl et al. | |
| 2005/0176366 A1 | 8/2005 | Levy | |
| 2006/0026535 A1 | 2/2006 | Hotelling et al. | |
| 2006/0036942 A1 | 2/2006 | Carter et al. | |
| 2006/0095848 A1 | 5/2006 | Naik | |
| 2006/0122946 A1* | 6/2006 | Fahrny | G06Q 20/3829 705/71 |
| 2006/0123357 A1 | 6/2006 | Okamura | |
| 2006/0156239 A1 | 7/2006 | Jobs et al. | |
| 2006/0173825 A1 | 8/2006 | Hess et al. | |
| 2006/0195462 A1* | 8/2006 | Rogers | G06F 21/10 |
| 2006/0218209 A1 | 9/2006 | Arrouye et al. | |
| 2006/0271870 A1 | 11/2006 | Anwar | |
| 2006/0282858 A1 | 12/2006 | Csicsatka et al. | |
| 2007/0016314 A1 | 1/2007 | Chan et al. | |
| 2007/0078876 A1 | 4/2007 | Hayashi et al. | |
| 2007/0083556 A1 | 4/2007 | Plastina et al. | |
| 2007/0083822 A1 | 4/2007 | Robbin et al. | |
| 2007/0142944 A1 | 6/2007 | Goldberg et al. | |
| 2007/0150830 A1 | 6/2007 | Ording et al. | |
| 2007/0156648 A1 | 7/2007 | Bridges et al. | |
| 2007/0168875 A1 | 7/2007 | Kowitz et al. | |
| 2007/0192368 A1 | 8/2007 | Nichols et al. | |
| 2007/0248311 A1 | 10/2007 | Wice et al. | |
| 2007/0299681 A1 | 12/2007 | Plastina et al. | |
| 2008/0040687 A1 | 2/2008 | Randall | |
| 2008/0086539 A1 | 4/2008 | Bloebaum et al. | |
| 2008/0155588 A1* | 6/2008 | Roberts | G06Q 30/00 725/34 |
| 2008/0249982 A1 | 10/2008 | Lakowske | |
| 2008/0249986 A1 | 10/2008 | Clarke-Martin et al. | |
| 2010/0017366 A1* | 1/2010 | Robertson | G06F 16/9535 |
| 2010/0100839 A1 | 4/2010 | Tseng et al. | |
| 2010/0281534 A1 | 11/2010 | Poder et al. | |
| 2010/0299639 A1* | 11/2010 | Ramsay | G06F 3/0486 715/835 |
| 2011/0143653 A1 | 6/2011 | Lane et al. | |
| 2012/0117026 A1* | 5/2012 | Cassidy | G06F 16/4387 707/634 |
| 2012/0151015 A1 | 6/2012 | Plastina et al. | |
| 2012/0227066 A1* | 9/2012 | Woxblom | G06F 21/10 725/25 |
| 2013/0047087 A1 | 2/2013 | Yamahara et al. | |
| 2013/0198268 A1 | 8/2013 | Hyman | |
| 2013/0198632 A1 | 8/2013 | Hyman | |
| 2013/0254340 A1* | 9/2013 | Lang | G06Q 30/02 709/218 |
| 2014/0067827 A1 | 3/2014 | Bilinski et al. | |
| 2015/0149901 A1 | 5/2015 | Otto et al. | |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Final Office Action dated May 16, 2016, issued in connection with U.S. Appl. No. 13/693,540, filed Dec. 4, 2012, 17 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
kayak.com, "KAYAK.com search results," Printed Sep. 23, 2013, 3 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Sep. 15, 2017, issued in connection with U.S. Appl. No. 13/693,540, filed Dec. 4, 2012, 24 pages.
Non-Final Office Action dated Sep. 24, 2015, issued in connection with U.S. Appl. No. 13/693,540, filed Dec. 4, 2012, 17 pages.

(56) References Cited

OTHER PUBLICATIONS

Non-Final Office Action dated Apr. 5, 2017, issued in connection with U.S. Appl. No. 13/693,540, filed Dec. 4, 2012, 24 pages.
Notice of Allowance dated May 4, 2018, issued in connection with U.S. Appl. No. 13/693,540, filed Dec. 4, 2012, 8 pages.
Palm, Inc., "Handbook for the Palm VII Handheld," May 2000, 311 pages.
Presentations at WinHEC 2000, May 2000, 138 pages.
Prismiq, Inc., "PRISMIQ Media Player User Guide," 2003, 44 pages.
roku.com, "Introducing Roku Search," Oct. 29, 2012, 4 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

\* cited by examiner

MEDIA CONTENT SEARCH BASED ON METADATA

CROSS REFERENCE TO RELATED APPLICATIONS

This application claims priority under 35 U.S.C. § 120 to, and is a continuation of, U.S. non-provisional application Ser. No. 13/693,540 filed on Dec. 4, 2012, entitled "Media Content Search Based on Metadata," which is incorporated herein by reference in its entirety.

FIELD OF THE DISCLOSURE

The disclosure is related to consumer goods and, more particularly, to systems, products, features, services, and other items directed to media playback or some aspect thereof.

BACKGROUND

Technological advancements have increased the accessibility of music content, as well as other types of media, such as television content, movies, and interactive content. For example, a user can access audio, video, or both audio and video content over the Internet through an online store, an Internet radio station, a music service, a movie service, and so on, in addition to the more traditional avenues of accessing audio and video content. Demand for audio, video, and both audio and video content inside and outside of the home continues to increase.

BRIEF DESCRIPTION OF THE DRAWINGS

Features, aspects, and advantages of the presently disclosed technology may be better understood with regard to the following description, appended claims, and accompanying drawings where:

FIG. 9—Example audio system with a list of supported music services including a "More Music" option.

Figure 1:
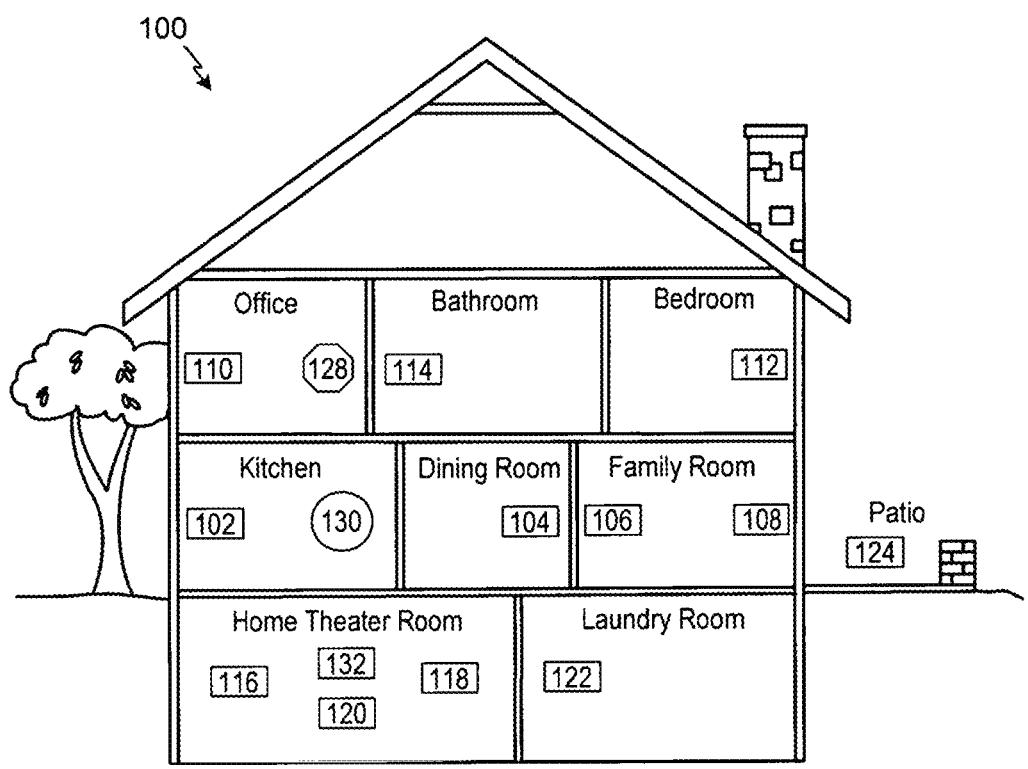
FIG. 1 shows an example configuration in which certain embodiments may be practiced.

In addition, the drawings are for the purpose of illustrating example embodiments, but it is understood that the inventions are not limited to the arrangements and instrumentality shown in the drawings.

DETAILED DESCRIPTION

I. Overview

Embodiments are described herein that allow a user of a networked playback system to quickly find media of interest via a controller, and for example, add the media, or a pointer thereto, to play the media now or add it to a digital repository. The embodiments are particularly useful when a user, while experiencing the media, such as by listening to the media being rendered via a network playback system, becomes interested in the particular media and wishes to initiate further action.

In one embodiment, the metadata associated with a first media may be displayed to a user via a controller during the playback of the first media. The user may select the metadata to initiate a search for media based on the metadata and the corresponding tag. The search for media may be performed by querying a media server. Results from the media server may be provided to the controller. The user may then, among other things, review the results of the media query via the controller, select media from the results, and initiate further action, such as play the media now or add the media to a digital repository (a digital library or playback queue).

In another embodiment, queried media server is associated with a service that is different from the service used to provide the first media. A service may include a user-controlled local media repository (e.g., media stored on a local network drive, a computer, a portable device, or some other device coupled to the local network), a user-controlled remote media repository (e.g., media stored on a server in the cloud), and/or a media content provider such as RHAPSODY™, SPOTIFY™, and others, more of which is described below.

In yet another embodiment, media servers from two or more different services are queried for the first media. In this embodiment, one of the two services may be the service that is used to render the media.

In yet another embodiment, the search results provide a user with one or more options. The user may be able to play the media now (a "play now" option) by selecting the media from the search results and/or add the media to a digital repository.

In one embodiment, a digital repository includes any of a library, a playback queue, a playlist, a favorites folder, or some other holding place of the media and/or pointer to the media. Examples are described below, but for purposes of illustration, the repository may reside in memory on a device coupled to the local playback network, such as a player or a controller or a network drive, or in memory on a device that is external to the local playback network, such as a remote server and/or cloud storage.

In one embodiment, media or a pointer thereto (collectively referred to herein as "media" or "media content") includes a file, a uniform resource identifier, or some other character(s) used to identify the media content. For instance, a repository may include one or more URLs that each identifies media, such as a song. The URLs may be specific for the media and the service. In another instance, a repository may include one or more media files, or a combination of files and URLs.

In one embodiment, metadata indicates certain aspects of the song, such as song title, artist name, album title, and/or genre, for example. In an embodiment, a user may select one of the aspects of the song indicated by the metadata, and a query may be made to search for songs based on the selected aspect. As described herein, in one example, the query may be made to search for one or more songs based on the selected aspect within a service or services.

According to an example, a user may be enjoying a particular song provided by an Internet Radio service, such as PANDORA™ via a networked playback system, such as sold by SONOS™. For instance, the user may become interested in the song, curious about other versions of the song, other songs by the same artist, other songs in the same album, and/or other songs in the same genre. Given the radio-like nature of PANDORA at this time, the service radio broadcasts the media and does not let the user directly choose the song, set the particular song to repeat, fast forward, or rewind to specific parts of the song. According to an embodiment described herein, the user can add the particular media (where the media is a song in this example) to a repository, such as a streaming music library or playlist (e.g., "My Library" in RHAPSODY™, a SPOTIFY™ library, or some other repository). Alternatively, the user may wish to purchase a copy of the particular song to be stored and accessed locally.

According to another example, a user may be enjoying a particular song provided by a streaming music service, such as RHAPSODY™ or SPOTIFY™ and would like create a station or channel on an Internet Radio service based on certain elements of the song. For instance, the user may want to create a PANDORA™ channel based on a genre of the particular song. In either case, the user may access a controller for the playback system to find other songs associated with elements of the song the user is experiencing.

Accordingly, the present application provides embodiments for enabling a user to search for media associated with certain media that the user is experiencing. In particular, the search for media may be performed for any media service available to the user rather than only the media service through which the media content experienced by the user is accessed.

In one aspect, a method is provided. The method involves while a first media is being rendered, receiving data indicating a selection of an item corresponding to a metadata associated with the first media, and querying one or more media servers for one or more second media content based on the corresponding metadata. The method further involves providing the one or more second media content for display.

In another aspect, an apparatus is provided. The apparatus includes at least one processor, a non-transitory computer readable medium, and program instructions stored on the non-transitory computer readable medium. The program instructions are executable by the at least one processor to perform functions including while a first media is being rendered, receiving data indicating a selection of an item corresponding to a metadata associated with the first media, and querying a media server for one or more second media based on the corresponding metadata. The functions further involve providing the one or more second media content for display.

In yet another aspect, a non-transitory computer readable medium having instructions stored thereon is provided. The instructions are executable by a computing device to cause the computing device to perform functions including while a first media is being rendered, receiving data indicating a selection of an item corresponding to a metadata associated with the first media, and querying a media server for one or more second content based on the corresponding metadata. The functions further involve providing the one or more second media content for display. Many other embodiments are provided and described herein.

II. Example Operating Environment

Referring now to the drawings, in which like numerals can refer to like parts throughout the figures, FIG. 1 shows an example system configuration 100 in which one or more embodiments disclosed herein can be practiced or implemented.

By way of illustration, the system configuration 100 represents a home with multiple zones, though the home could have been configured with only one zone. Each zone, for example, may represent a different room or space, such as an office, bathroom, bedroom, kitchen, dining room, family room, home theater room, utility or laundry room, and patio. A single zone might also include multiple rooms or spaces if so configured. One or more of zone players 102-124 are shown in each respective zone. A zone player 102-124, also referred to as a playback device, multimedia unit, speaker, player, and so on, provides audio, video, and/or audiovisual output. A controller 130 (e.g., shown in the kitchen for purposes of illustration) provides control to the system configuration 100. Controller 130 may be fixed to a zone, or alternatively, mobile such that it can be moved about the zones. The system configuration 100 may also include more than one controller 130. The system configuration 100 illustrates an example whole house audio system, though it is understood that the technology described herein is not limited to its particular place of application or to an expansive system like a whole house audio system 100 of FIG. 1.

a. Example Zone Players

Figure 2A:
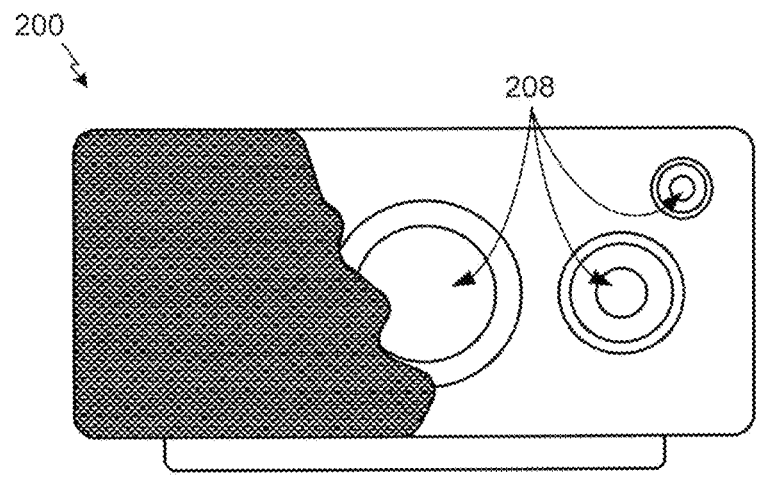
FIG. 2A shows an illustration of an example zone player having a built-in amplifier and transducers.
Figure 2B:
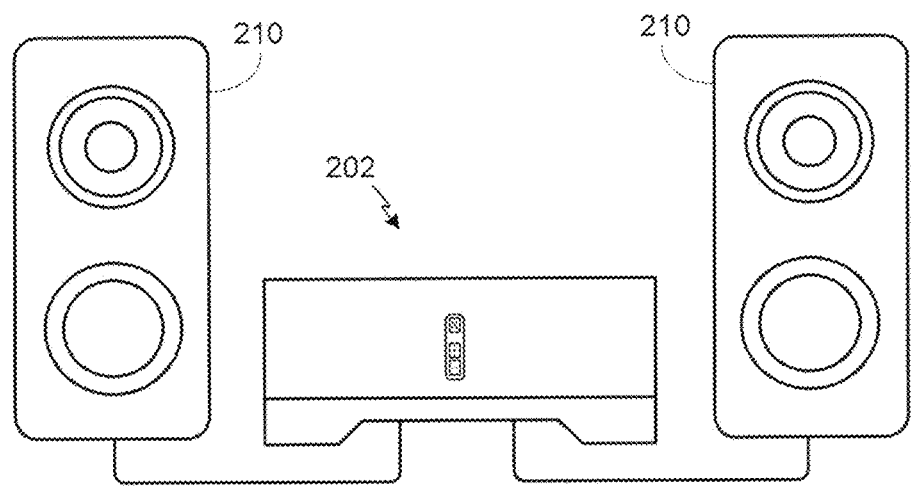
FIG. 2B shows an illustration of an example zone player having a built-in amplifier and connected to external speakers.
Figure 2C:
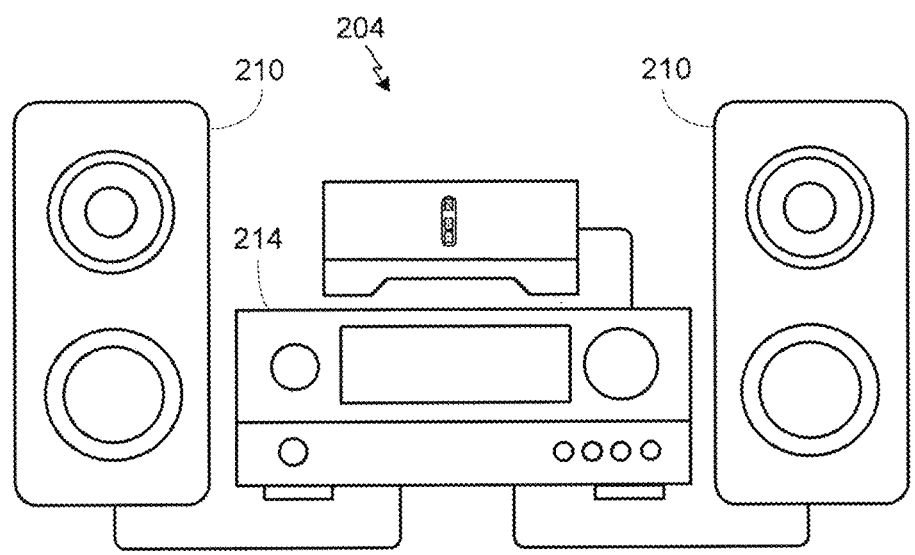
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more acoustic transducers (e.g., speakers). A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 is configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a zone player may contain a playlist or queue of audio items to be played (also referred to herein as a "playback queue"). Each item in the queue may comprise a uniform resource identifier (URI) or some other identifier. The URI or identifier can point the zone player to the audio source. The source might be found on the Internet (e.g., the cloud), locally from another device over data network 128 (described further below), from the controller 130, stored on the zone player itself, or from an audio source communicating directly to the zone player. In some embodiments, the zone player can reproduce the audio itself, send it to another zone player for reproduction, or both where the audio is played by the zone player and one or more additional zone players in synchrony. In some embodiments, the zone player can play a first audio content (or not play at all), while sending a second, different audio content to another zone player(s) for reproduction.

By way of illustration, SONOS, Inc. of Santa Barbara, Calif. presently offers for sale zone players referred to as a "PLAY:5," "PLAY:3," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player can include or interact with a docking station for an Apple IPOD™ or similar device.

b. Example Controllers

Figure 3:
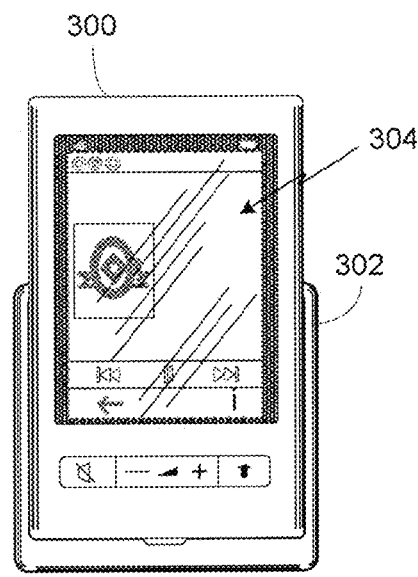
FIG. 3 shows an illustration of an example controller.

FIG. 3 illustrates an example wireless controller 300 in docking station 302. By way of illustration, controller 300 may correspond to controlling device 130 of FIG. 1. Docking station 302, if provided, may be used to charge a battery of controller 300. In some embodiments, controller 300 may be provided with a touch screen 304 that allows a user to interact through touch with the controller 300, for example, to retrieve and navigate a playlist of audio items, control operations of one or more zone players, and provide overall control of the system configuration 100. In certain embodiments, any number of controllers can be used to control the system configuration 100. In some embodiments, there may be a limit set on the number of controllers that can control the system configuration 100. The controllers might be wireless like wireless controller 300 or wired to data network 128.

In some embodiments, if more than one controller is used in system 100, each controller may be coordinated to display common content, and may all be dynamically updated to indicate changes made from a single controller. Coordination can occur, for instance, by a controller periodically requesting a state variable directly or indirectly from one or more zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an IPHONE™, IPAD™, ANDROID™ powered phone, or any other smart phone or network-enabled device can be used as controller 130. An application running on a laptop or desktop personal computer (PC) or Mac™ can also be used as controller 130. Such controllers may connect to system 100 through an interface with data network 128, a zone player, a wireless router, or using some other configured connection path. Example controllers offered by Sonos, Inc. of Santa Barbara, Calif. include a "Controller 200," "SONOS® CONTROL," "SONOS® Controller for IPHONE™," "SONOS® Controller for IPAD™," "SONOS® Controller for ANDROID™," "SONOS® Controller for MAC™ or PC."

c. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players 102-124 are wirelessly coupled to data network 128 using a non-mesh topology. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device can be set in a consolidated mode, for example.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, music on a zone player itself may be accessed and a played. In some embodiments, music from a personal library stored on a computer or networked-attached storage (NAS) may be accessed via the data network 128 and played. In some embodiments, Internet radio stations, shows, and podcasts can be accessed via the data network 128. Music or cloud services that let a user stream and/or download music and audio content can be accessed via the data network 128. Further, music can be obtained from traditional sources, such as a turntable or CD player, via a line-in connection to a zone player, for example. Audio content can also be accessed using a different protocol, such as AIRPLAY™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Example Zone Players

Figure 4:
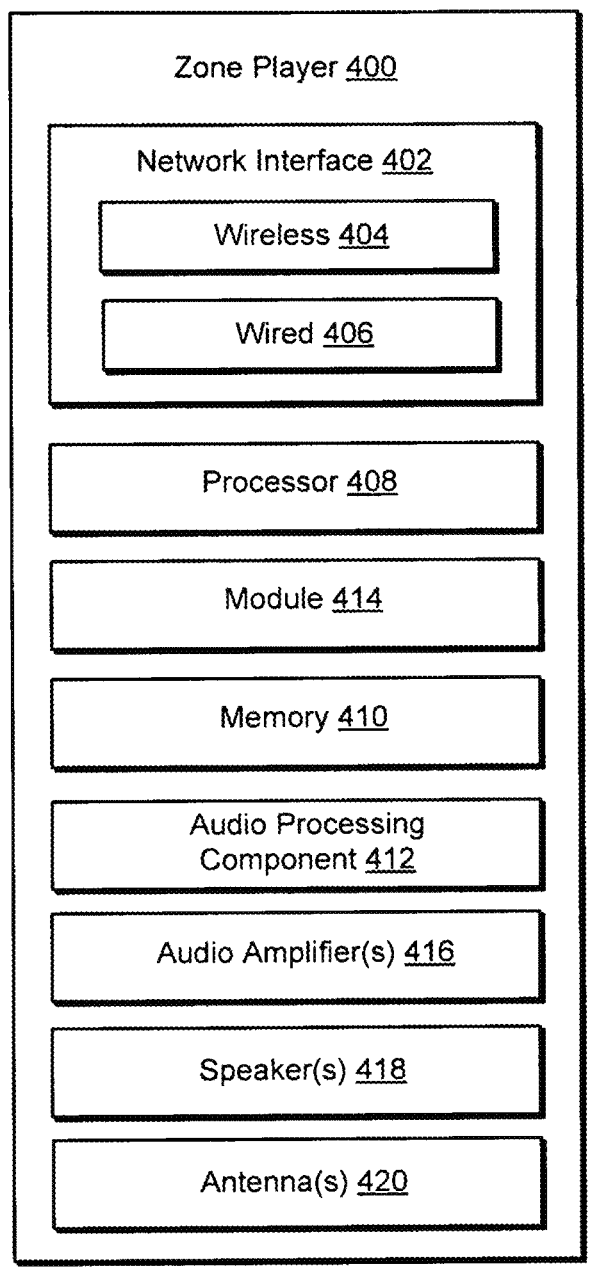
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, or 802.15). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY:5™, is a zone player with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5™.

IV. Example Controller

Figure 5:
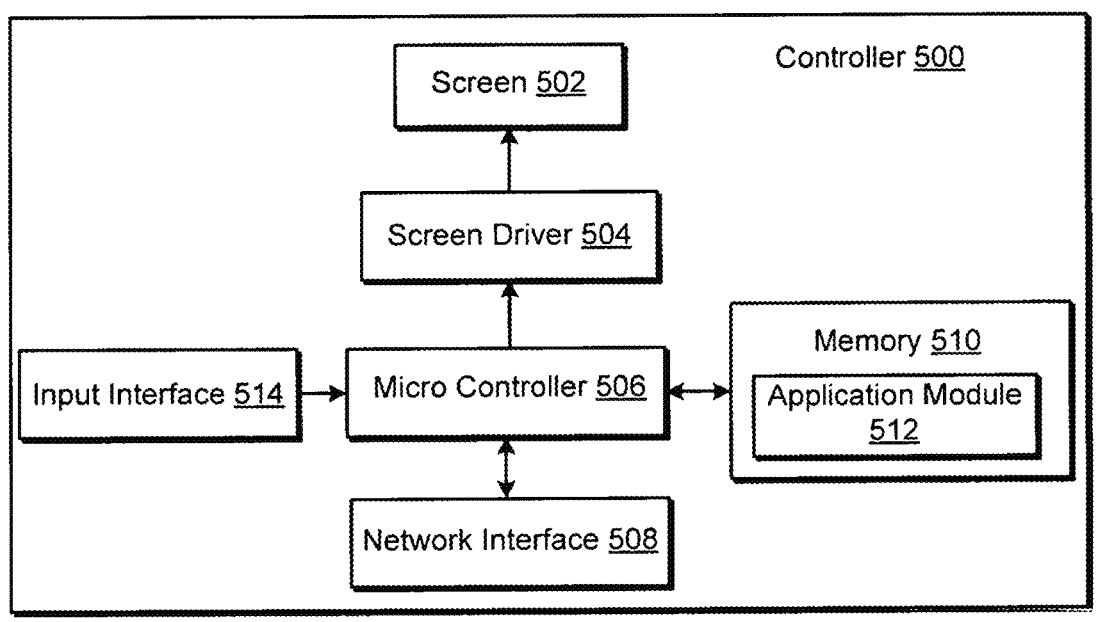
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.15, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an IPHONE™, IPAD™ or any other smart phone or network-enabled device (e.g., a networked computer such as a PC or MAC™) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group play back an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Example Ad-Hoc Network

Figure 6:
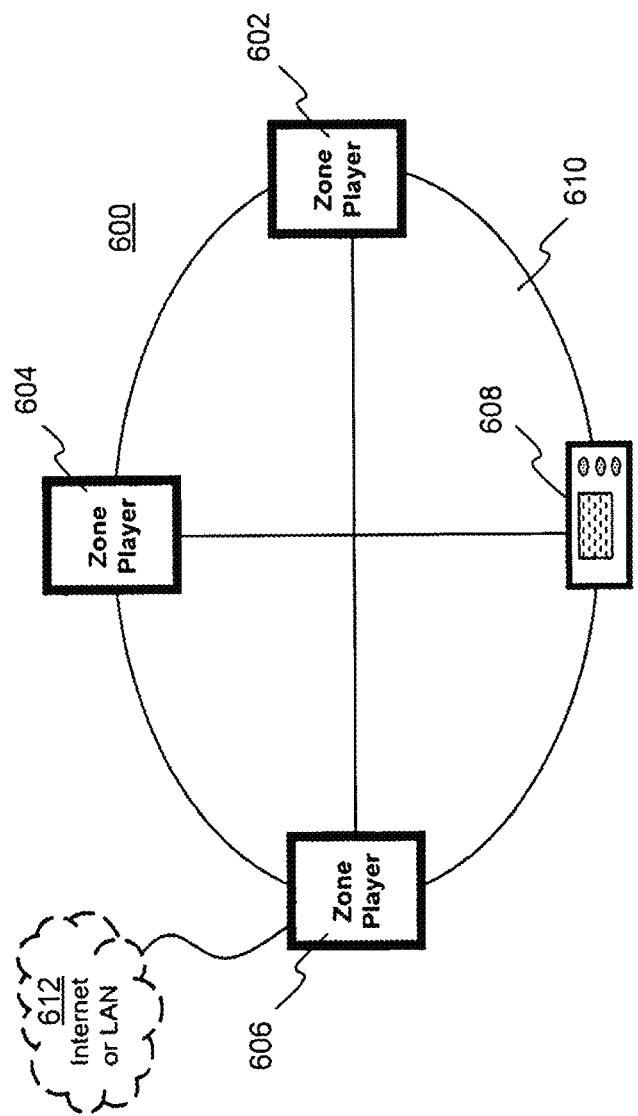
FIG. 6 shows an example ad-hoc playback network.

Certain particular examples are now provided in connection with FIG. 6 to describe, for purposes of illustration, certain systems and methods to provide and facilitate connection to a playback network. FIG. 6 shows that there are three zone players 602, 604 and 606 and a controller 608 that form a network branch that is also referred to as an Ad-Hoc network 610. The network 610 may be wireless, wired, or a combination of wired and wireless. In general, an Ad-Hoc (or "spontaneous") network is a local area network or other small network in which there is generally no one access point for all traffic. With an established Ad-Hoc network 610, the devices 602, 604, 606 and 608 can all communicate with each other in a "peer-to-peer" style of communication, for example. Furthermore, devices may join and/or leave from the network 610, and the network 610 will automatically reconfigure itself without needing the user to reconfigure the network 610. While an Ad-Hoc network is referenced in FIG. 6, it is understood that a playback network may be based on a type of network that is completely or partially different from an Ad-Hoc network.

Using the Ad-Hoc network 610, the devices 602, 604, 606, and 608 can share or exchange one or more audio sources and be dynamically grouped to play the same or different audio sources. For example, the devices 602 and 604 are grouped to playback one piece of music, and at the same time, the device 606 plays back another piece of music. In other words, the devices 602, 604, 606 and 608, as shown in FIG. 6, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 610 (or household identifier), though a HOUSEHOLD may be identified with a different area or place.

In certain embodiments, a household identifier (HHID) is a short string or an identifier that is computer-generated to help ensure that it is unique. Accordingly, the network 610 can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy or other security keys). In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., WEP keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 308 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 606 in FIG. 6 is shown to be connected to both networks, for example. The connectivity to the network 612 is based on Ethernet and/or Wireless, while the connectivity to other devices 602, 604 and 608 is based on Wireless and Ethernet if so desired.

It is understood, however, that in some embodiments each zone player 606, 604, 602 may access the Internet when retrieving media from the cloud (e.g., the Internet) via the bridging device. For example, zone player 602 may contain a uniform resource locator (URL) that specifies an address to a particular audio track in the cloud. Using the URL, the zone player 602 may retrieve the audio track from the cloud, and ultimately play the audio out of one or more zone players.

VI. Example System Configuration

Figure 7:
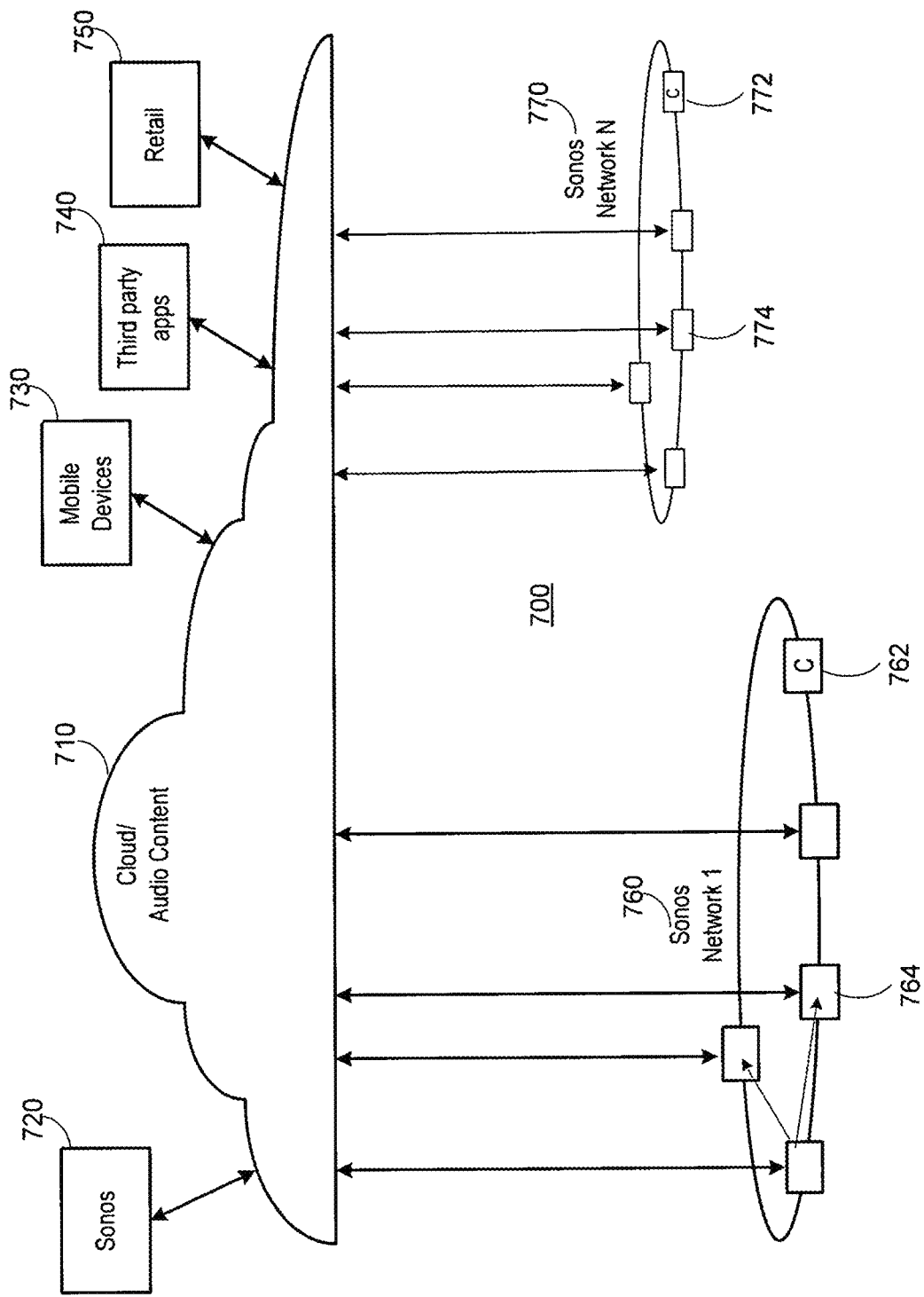
FIG. 7 shows a system including a plurality of networks including a cloud-based network and at least one local playback network.

FIG. 7 shows a system including a plurality of networks including a cloud-based network and at least one local playback network. A local playback network includes a plurality of playback devices or players, though it is understood that the playback network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 700 of FIG. 7, a plurality of content providers 720-750 can be connected to one or more local playback networks 760-770 via a cloud and/or other network 710. Using the cloud 710, a multimedia audio system 720 (e.g., Sonos™), a mobile device 730, a third party application 740, a content provider 750 and so on can provide multimedia content (requested or otherwise) to local playback networks 760, 770. Within each local playback network 760, 770, a controller 762, 772 and a playback device 764, 774 can be used to playback audio content.

VII. Example Media Search

As mentioned above, embodiments for allowing a user to quickly search for media associated with media the user is experiencing are provided herein.

In one embodiment, a controller displays metadata of the media, such as song title, artist name, album title, or genre, to a user, and subsequent to receiving a selection of the item, a search is initiated based on the metadata and its corresponding tag. For example, a controller might display "Track: Promises in the Dark." A user can quickly and directly select "Promises in the Dark" via the controller display, which triggers a search based on (1) the tag: "Track" and (2) "Promises in the Dark." As such, in one instance, the search may result in one or more tracks that contain "Promises in the Dark."

In another embodiment, a different service is searched subsequent to selection of metadata for media than the service used to render the media. For example, a user might be listening to Pandora™ via a networked playback system and a controller to the system might display the current track. Using the "Promises in the Dark" example above, assume that the song from the "Greatest Hits" album was being streamed from Pandora to a networked playback system. If so desired, the user can initiate a search on the user's Rhapsody™ service based on the selection of the metadata associated with the media. If the song title was selected for the search, then the system would query Rhapsody for tracks that include "Promises in the Dark" (or some variation of the phrase promises in the dark, if so programmed). The results might include other songs by Pat Benatar including "Promises in the Dark" on several different albums.

In yet another embodiment, two or more services are searched for media. In this embodiment, it is possible that one of the services be the service that is used to render the media. For example, a user might be listening to a Rhapsody channel via a networked playback system and a controller to the system might display the current track. If so desired, the user can initiate a search on Rhapsody in addition to search another service. For example, the system may also query the user's local library for an appropriate match.

In yet another embodiment, the search results displayed on the controller, for instance, provide the user with one (or more) options. For example, the user may be able to play the media now (a "play now" option) by selecting the media from the search results, add the media to a queue or playlist, or add the media to a digital repository. By way of illustration, a user may see a track of interest in the search results and select it to "play now" via a networked playback system. As such, the networked playback system would stop/pause playing the current media and switch to play the recently selected media from the associated service. In some embodiments, the networked playback system may return the previous media/service upon completion of the rendering of the selected media.

Figure 8B:
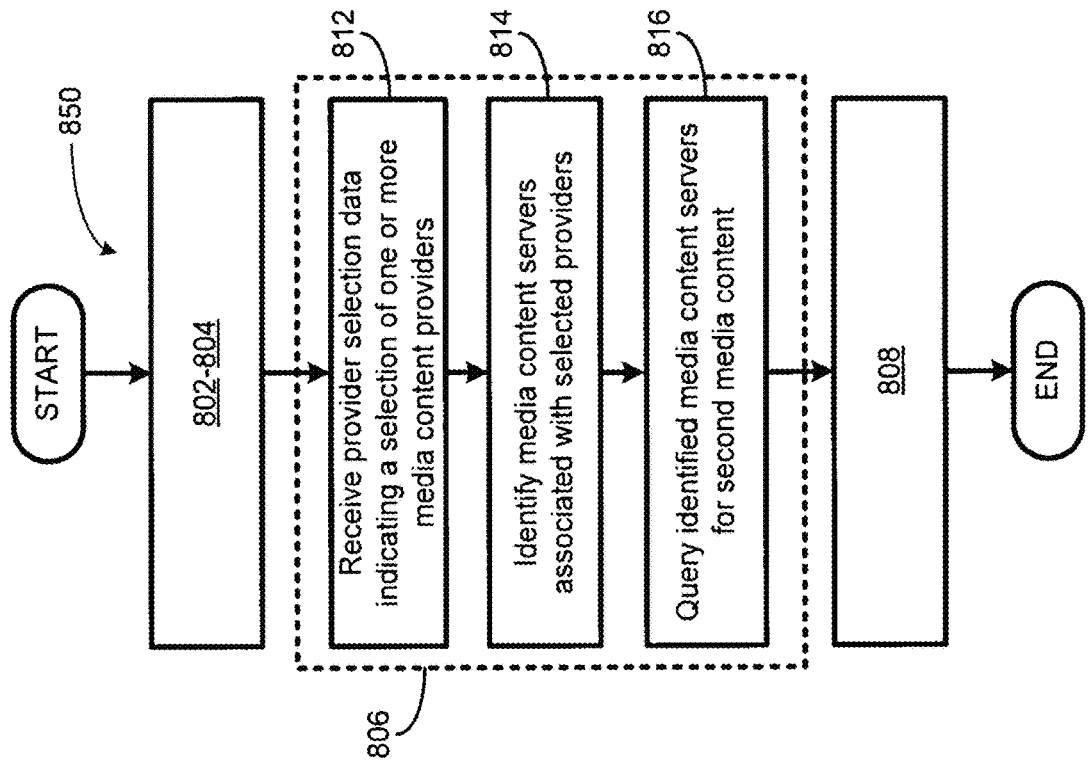
FIG. 8B shows an alternative example flow diagram for searching media content.
Figure 8A:
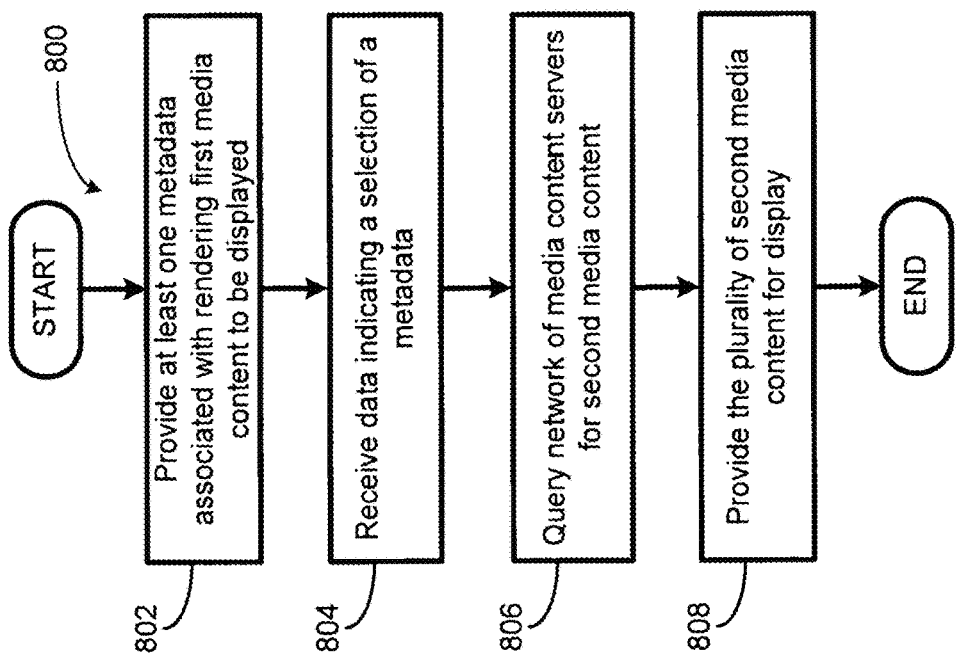
FIG. 8A shows an example flow diagram for searching media content.

FIG. 8A shows an example flow diagram of a method 800 for searching media content, in accordance with at least some embodiments described herein. Method 800 shown in FIG. 8A presents an embodiment of a method that could be used in the environment 100 with the systems 200, 202, 204, 300, 400, and 500 for example, in communication with a device, such as devices illustrated in FIGS. 2-5. Method 800 may include one or more operations, functions, or actions as illustrated by one or more of blocks 802-808. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 800 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 900 and other processes and methods disclosed herein, each block in FIG. 8A may represent circuitry that is wired to perform the specific logical functions in the process.

Figure 9B:
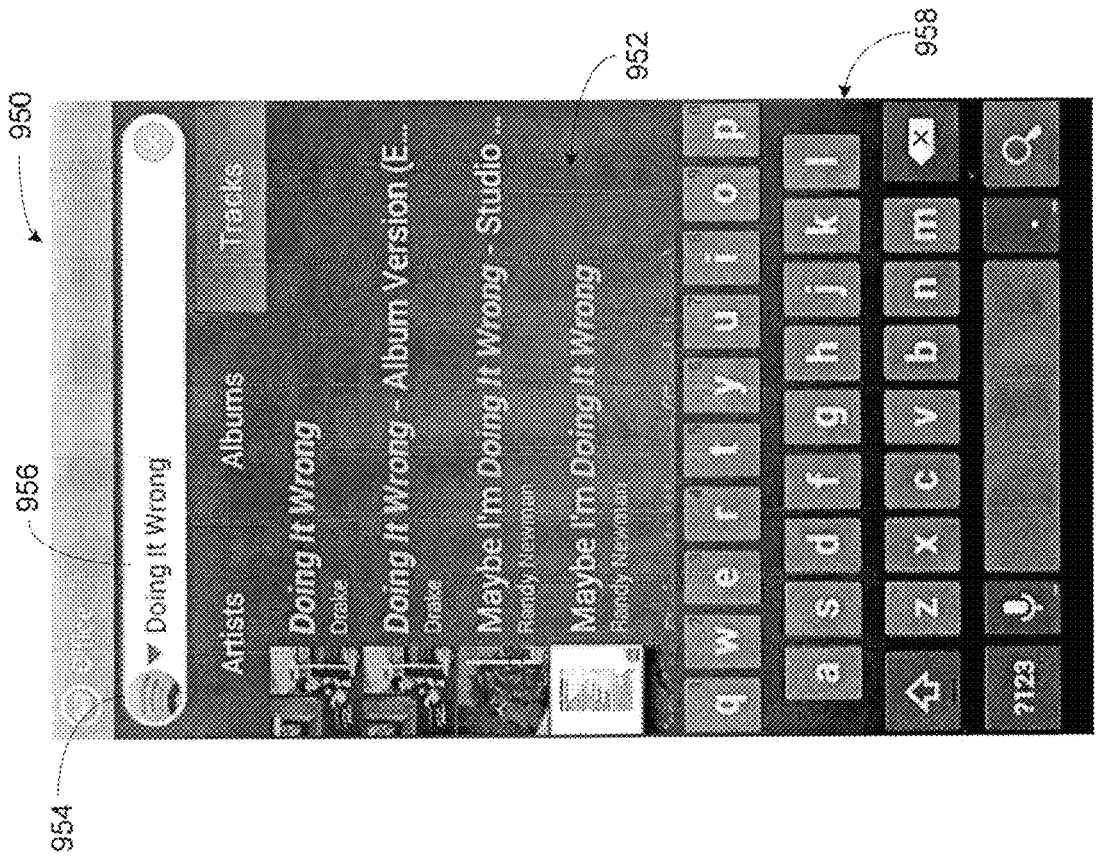
FIG. 9B shows an example media system user interface displaying media content from a media content search.
Figure 9A:
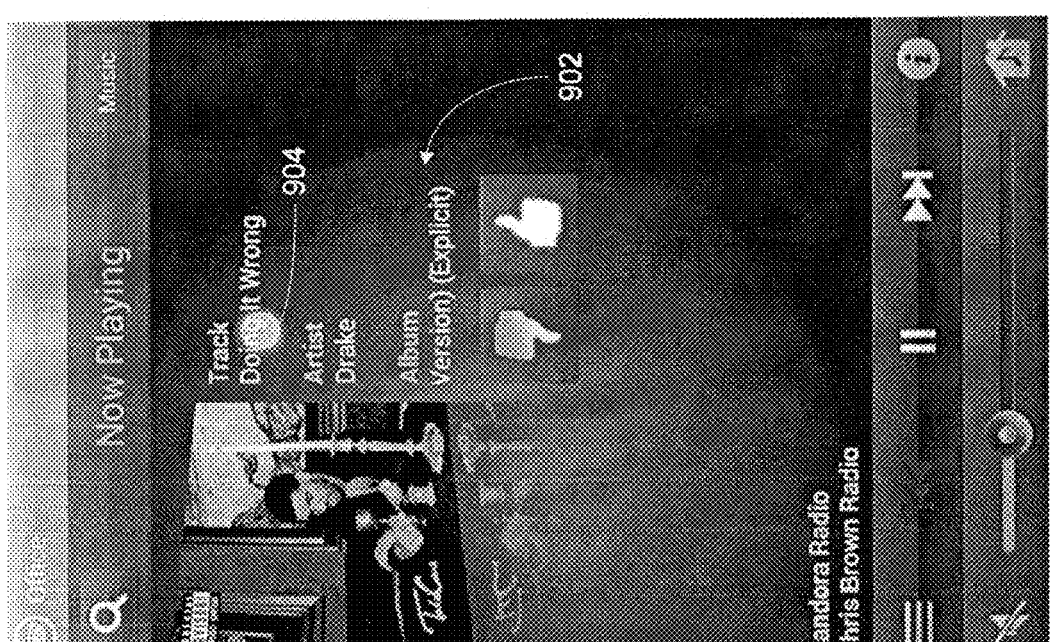
FIG. 9A shows an example media system user interface through which a media content search may be initiated.

At block 802, the method 800 may involve providing for display at least one metadata associated with a rendering first media content. In one example, during rendering of the first media content on a zone player or network of zone players as discussed above, the at least one metadata may be provided on a display of the controller, such as the controller 300 or 500 described above. In a case where the media content is a song, the metadata may be indicative of one or more of an artist name, a track title, an album name, a genre of the song, and a year when the song was released, and a portion of the metadata may be provided on a display of the controller for the user to review while the song is being played. FIG. 9A shows an example media system user interface 900 while the first media content is being rendered. As shown, the user interface 900 displays metadata 902 associated with the first media content. In this illustrative example, the song title, listed under Track is "Doing It Wrong," and the artist name, listed under Artist is "Drake."

In one example, the metadata may be provided when the first media content is accessed. For instance, when the first media content is accessed through a media content service, the metadata may be retrieved along with retrieval of the first media content being rendered. In another instance, the first media content may be a local file on the controller device used by the user to experience media content, for example. In this instance, the metadata may also be stored locally and provided when the first media content is being rendered.

In another example, metadata associated with the first media content may not be readily available and/or not provided with the first media content. For instance, if the first media content is stored locally, and the associated metadata may not have been properly stored or entered when the first media content was stored, then the metadata may be provided at a subsequent time and/or from a different device or service.

In another instance, metadata associated with the first media content may not be readily available because the first media content may be specific content within an automated streaming audio content. Automated streaming audio content may refer to audio content that may be played indefinitely, with a series of specific content determined by a streaming media content service. For instance, a media content service, such as PANDORA™, may allow the user to select a "channel" based on genre or artist, for example, and accordingly the service determines individual tracks (specific content) to be played, based on the selected channel. In another example, a media content service such as NPR or other traditional, live radio station-based media content services, may allow the user to select the radio station to be rendered, and the streaming service may simply provide a stream of the live content of the radio station (as available over traditional radio frequencies). In such a case, metadata for the specific content may not be available because metadata provided and displayed on the display may be associated with the "channel" or specific radio station providing the automated streaming audio content, rather than associated with the specific content being rendered and enjoyed by the user.

In the case when the metadata for the first media content is not available, the metadata may be separately retrieved. In one example, the metadata for the first media content may be retrieved by providing characterization data associated with at least a portion of the first media content to a processing server for analysis. For instance, a service such as SHAZAM® may be utilized to retrieve characterization data associated with a portion of the first media content, analyze the characterization data, and provide metadata associated with the first media content determined from analysis of the characterization data. Accordingly, the metadata may be received from the processing server and provided on the display of the controller for the user to review.

At block 804, the method 800 may involve receiving data indicating a selection of the at least one metadata that is displayed. As mentioned previously, the data may be received while the first media content is being rendered, and being enjoyed by the user. In one example, the user may wish to search for other media content associated with the selected one metadata. In one case, the controller displaying the metadata associated with the first media content may have a touchscreen user interface. In this case, the user may select the metadata associated with the media content by tapping the displayed metadata on the display. Referring back to FIG. 9A showing the user interface 900, a selection 904 may represent a touch selection of the song title metadata provided on the display. As illustrated in FIG. 9A, the selection 904 may indicate that the user is interested in searching for other media content having the same title as, or a title similar to "Doing It Wrong."

At block 806, the method 800 may involve querying a network media server for second media content based on the selected metadata. In one example, the network media server may be a part of a collection of one or more media content servers being queried to which the user has access. In another example, the collection of one or more media content servers being queried may include media content servers to which the user does not have access, such as media content servers associated with media content services that the user may not be registered. The media content servers may include remote servers as well as local servers or data storage medium.

Continuing with the example above, the collection of media content servers may be queried for second media content having titles similar or the same as "Doing It Wrong." In one case, the second media content being queried for may be any type of media content, and not restricted to the same media content type as the first media content. For instance, "Doing It Wrong" in this example may be a song in the form of an audio content. As such, querying the network of media content servers for second media content may involve querying the network of media content servers for audio content having titles similar to or the same as "Doing It Wrong" as well as other types of media content, such as video content having titles similar to or the same as "Doing It Wrong."

In one example, each media content service in a plurality of media content services may be associated with one or more media content servers in the network of media content servers. The collection of media content servers may include media content servers that the user has access to as well as media content servers that the user may not have access to. In one case, the media content servers that the user has access to may be servers associated with media content services that the user is registered with, and the media content servers the user may not have access to may be associated with media content services that the user may not have registered with yet. In addition, the network of media content servers may include a local server or hard disk drive (on the controller and/or a zone player) on which the user may store media content. Examples of media content services, as suggested previously, may include Spotify™, Rhapsody™, and PANDORA™, for example. As also suggested previously, the media content servers may include a local servers or data storage medium to which the user has access to.

In one example, each of the one or more media content servers in a collection or network of media content servers may be queried. In another example, a subset of the media content servers may be queried, if more than one server exists. FIG. 8B shows an example flow diagram of a method 850 for searching for media. As shown, the method 850 may be an alternative method to the method 800 shown in FIG. 8A, and may include blocks 802-808 from method 800. In method 850, however, block 806 may further include blocks 812-816 for querying a network of one or more media content servers for second media content.

At block 812, the method 850 may involve receiving service selection data indicating a selection of one or more media content services. In one example, the service selection data may be received from the user. In this example, a list of the plurality of media content services may be displayed for the user to review. In one case, the list of the plurality of media content services may include each media content service the user has access to. In another case, the list of the plurality of media content services may include all media content services available, whether or not the user may have access. In response to the list of the plurality of media content services being displayed, the user experiencing the rendering of the first media content may then provide service selection data indicating a selection of one or more media content services to query for the second media content.

In another example, the service selection data may be of a default or predetermined value. For instance, if the user had previously initiated a query as currently described, and had previously provided service selection data, the previously provided service selection data may be stored on the controller accessed by the user, on a zone player, or both. The stored service selection data may then be used as an initial selection of media content services for the present query. In this instance, the selection may be modified by the user for the present search, or left as-is.

In another instance, the service selection data may be automatically determined according to various factors. In one case, the media content service that was most recently used (for rendering media content, as opposed to media content service queried in most recent search, discussed above) may be selected. As such, the media content service selected may be the same media content service providing the first media content in this case. In another case, the most reliable media content service may be selected. In this case, reliability of a media content service in the network of media content services may be determined locally by the controller and/or playback system by monitoring playback dropouts during previous use of the media content service by the local playback system. Alternatively, reliability of a media content service may be determined remotely by a server monitoring playback dropouts during previous use of the media content service by any playback system for which playback dropout information may be available.

In some cases, more than one media content service may be selected and queried for the second media content. In one case, a selection of the two most reliable media content services may be selected. In another case, the user may select three media content services the user favors. In yet another case, the user may select an additional media content service favored by the user in addition to a most reliable media content service determined by the playback system or server. The selection may also be based on fees or costs associated with a particular service.

At block 814, the method 850 may involve identifying media content servers in the network of media content servers associated with the selection of one or more media content services. As mentioned above, each media content service may be associated with at least one media content server. As such, once the selection of media content services has been determined, the corresponding media content servers may be identified, and at block 816, method 850 may involve querying the identified media content servers for the one or more second media content based on the corresponding metadata.

In one case, if the query does not return any second media content, the system may save the query information on the controller, playback system, or both, for a future query. The query information may include at least the metadata selected, and the selection of media content services for the query. In one instance, the user may be prompted by the controller, or by the playback system via the controller, to provide an alternative metadata or alternative selection of media content services for a subsequent query.

In another case, if at least one second media content is returned, the method 850 may proceed to block 808, which as shown in FIG. 8A, may involve providing the one or more second media content for display. As suggested above, the one or more second media content display may include music tracks, music albums, radio stations, or video content corresponding to the selected metadata associated with the first media content. Additionally, the user may select which of the displayed items to include in a digital repository for further action.

In one example, providing the one or more second media content for display may further involve ordering the one or more second media content according to a relevancy metric. The relevancy metric may indicate an estimated level of interest in each of the one or more second media content by the user experiencing the rendering of the first media content.

In some cases, the relevancy metric may indicate an estimated level of interest in the returned second media content based on the media content service associated with the second media content. In one case, the relevancy metric may indicate that a most recently used media content service among the selection of media content services for the query is of the most interest to the user, and may therefore list second media content associated with the most recently used media content service first. In another case, the relevancy metric may indicate that a most reliable media content service among the selection of media content services for the query is of most interest to the user, and may therefore list second media content associated with the most reliable media content service first.

In other cases, the relevancy metric may indicate an estimated level of interest in the returned second media content based on characteristics of the second media content. For instance, second media content having the closest match in the query based on the selected metadata may be listed first. In another instance, second media content having the highest bit-rate and/or highest quality may be listed first. In a further instance, second media content that is the most popular (played back the most number of times) may be listed first.

Whichever the case, the one or more second media content may be ordered according to the relevancy metric and accordingly provided for display on the controller for the user to review. FIG. 9B shows an example media system user interface 950 displaying media content from a media content search. As shown, results 952 for a query based on song title metadata "Doing It Wrong" 954 are provided as a result of the selection of the song title being selected (shown in FIG. 9A). Also shown in FIG. 9B is a media content service icon 954 indicating the media content service the results 952 are associated with, and a input interface 958 via which the user may modify the search criteria.

In this illustrative example, second media content associated with Spotify™ may be shown. In this case, the user may select another media content service, such as Rhapsody™, to see second media content associated with Rhapsody™. In the case the user interface is a touchscreen interface, a list of media content services for which second media content query results are available may be provided when the user taps on the media content service icon 954. The user may then select another media content service from the list to review second media content associated with the selected, other media content service.

In one example, the user may be provided with a list of all media content services available when tapping the media content service icon 954. In this case, if the selected media content service was not previously included in the query for second media content, a subsequent search for second media content with the selected media content service may be initiated.

After reviewing the query results, the user may select a second media content from the displayed results and initiate further action. For instance, if the query is initiated when the user is enjoying a particular song provided through PANDORA™, the user may choose to add the particular song to a streaming music library or playlist (e.g., "My Library" in Rhapsody™ or a Spotify™ library). Once the media is included in the repository, such as the streaming music library or playlist, for example, the user may access the media at a later time. Alternatively, the user may wish to purchase a copy of the particular song to be stored and accessed locally. Media content services from which the user may purchase the particular song may include iTunes™ or Amazon™. In another instance, if the query was initiated while the user may be enjoying a particular song provided by a streaming music service, such as Rhapsody™ or a Spotify™, the user may choose to create a PANDORA™ channel based on a genre of the particular song.

In another case, the second media content selected by the user may be associated with a media content service the user may not be registered with. In this case, the user may be prompted to sign-in or register with the media content service in order to access the selected second media content.

In other embodiments, the query for second media content may not be based strictly on metadata displayed for the user to review or even metadata associated with the first media content. As discussed above, a service such as SHAZAM® may be used to retrieve metadata for the first media content. In one example, SHAZAM® may also be utilized to identify specific melodies or chord progressions within a song, and subsequently use the identified melodies or chord progressions to search for other songs having similar melodies or chord progressions. In one case, the user may select a portion of a song being rendered by selecting a segment on a playback progression bar on the user interface corresponding to the portion of the song, and initiate a search for other song shaving similar melodies or chord progressions as the selected portion.

In other embodiments, the query for second media content may be postponed and executed at a later time. This may be the case so as not to disrupt the current experience of the first media content by the user. As such, the user may choose to flag metadata associated with the first media content being rendered and provided on the user interface, and initiate the actual query for second media content at a later time.

VIII. Conclusion

The descriptions above disclose various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

As provided in the embodiments discussed above, the present application enables a user to search for media content associated with media content the user is experiencing. In some embodiments, the search for media content may be performed for any media content service rather than only the media content service through which the media content experienced by the user is accessed.

In one aspect, a method is provided. The method involves while a first media content is being rendered, receiving data indicating a selection of an item corresponding to a metadata associated with the first media content, and querying a network of media content servers for one or more second media content based on the corresponding metadata. Each media content service in a plurality of media content services is associated with one or more media content servers in the network of media content servers. The method further involves providing the one or more second media content for display.

In another aspect, a system is provided. The system includes at least one processor, a non-transitory computer readable medium, and program instructions stored on the non-transitory computer readable medium. The program instructions are executable by the at least one processor to perform functions including while a first media content is being rendered, receiving data indicating a selection of an item corresponding to a metadata associated with the first media content, and querying a network of media content servers for one or more second media content based on the corresponding metadata. Each media content service in a plurality of media content services is associated with one or more media content servers in the network of media content servers. The functions further involve providing the one or more second media content for display.

In yet another aspect, a non-transitory computer readable medium having instructions stored thereon is provided. The instructions are executable by a computing device to cause the computing device to perform functions including while a first media content is being rendered, receiving data indicating a selection of an item corresponding to a metadata associated with the first media content, and querying a network of media content servers for one or more second media content based on the corresponding metadata. Each media content service in a plurality of media content services is associated with one or more media content servers in the network of media content servers. The functions further involve providing the one or more second media content for display.

Additionally, references herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

We claim:

1. A tangible, non-transitory computer-readable medium having stored thereon instructions executable by a one or more processors to cause a mobile device to perform a method comprising:

receiving, via a network interface from one or more servers of a streaming media service, data representing first metadata that is associated with a first audio track that is being played back via a playback device, wherein the playback device and the mobile device are connected via a local area network;

displaying, on a graphical user interface of a streaming media service application, the first metadata that is associated with the first audio track that is being rendered, wherein a particular user account of the streaming media service is associated with the streaming media service application;

while the first audio track is being played back via the playback device, receiving, via the graphical user interface of the streaming media service application displayed on the mobile device, input data indicating a selection of an item of the first metadata from among the displayed first metadata that is associated with the first audio track being rendered;

querying, via the network interface, one or more media servers of a streaming media service for one or more second audio tracks that are associated with second metadata matching the selected item of first metadata;

displaying, on the graphical user interface of the streaming media service application, an indication of the one or more second audio tracks that are associated with second metadata matching the selected item of first metadata;

receiving, via the graphical user interface of the streaming media service application, input data indicating a selection of at least one second audio track from among the one or more second audio tracks; and generating a container that includes the selected at least one second audio track.

2. The tangible, non-transitory computer-readable medium of claim 1, wherein generating the container that includes the selected at least one second audio track comprises seeding a new Internet radio station with the selected at least one second audio track.

3. The tangible, non-transitory computer-readable medium of claim 1, wherein generating the container that includes the selected at least one second audio track comprises adding the selected at least one second audio track to a new playlist.

4. The tangible, non-transitory computer-readable medium of claim 1, wherein generating the container that includes the selected at least one second audio track comprises adding the selected at least one second audio to a user library associated with the particular user account of the streaming media service.

5. The tangible, non-transitory computer-readable medium of claim 1, wherein the playback device is playing back the first audio track, and wherein the mobile device is not playing back the first audio track.

6. The tangible, non-transitory computer-readable medium of claim 5, wherein the first audio track was selected for playback by the playback device on another mobile device.

7. The tangible, non-transitory computer-readable medium of claim 5, wherein the method further comprises:

receiving, via the graphical user interface of the streaming media service application, input data indicating a command to play back the selected at least one second audio track; and causing the playback device to play back the selected at least one second audio track, wherein causing the playback device to play back the selected at least one second audio track comprises sending, via a network interface of the mobile device, a command that causes the playback device to stream the selected at least one second audio track from the streaming media service.

8. The tangible, non-transitory computer-readable medium of claim 1, wherein the first metadata is indicative of one or more of the following: (a) artist name of the first audio track, (b) track title of the first audio track, (c) album name of the first audio track, (d) genre of the first audio track, and (e) year of release of the first audio track, and wherein querying, via the network interface, one or more media servers of a streaming media service for one or more second audio tracks that are associated with second metadata matching the selected item of first metadata comprises querying the one or more media servers of the streaming media service for one or more second audio tracks that are associated with second metadata having the same (a) artist name, (b) track title, (c) album name, (d) genre, or (e) year of release as the first audio track.

9. The tangible, non-transitory computer-readable medium of claim 1, wherein generating the container that includes the selected at least one second audio track comprises adding the selected at least one second audio track and one or more additional audio tracks to a new playlist.

10. The tangible, non-transitory computer-readable medium of claim 9, wherein the audio tracks in the new playlist are ordered according to a relevancy metric.

11. A method to be performed by a mobile device, the method comprising:
  receiving, via a network interface from one or more servers of a streaming media service, data representing first metadata that is associated with a first audio track that is being played back via a playback device, wherein the playback device and the mobile device are connected via a local area network;
  displaying, on a graphical user interface of a streaming media service application, the first metadata that is associated with the first audio track that is being rendered, wherein a particular user account of the streaming media service is associated with the streaming media service application;
  while the first audio track is being played back via the playback device, receiving, via the graphical user interface of the streaming media service application displayed on the mobile device, input data indicating a selection of an item of the first metadata from among the displayed first metadata that is associated with the first audio track being rendered;
  querying, via the network interface, one or more media servers of a streaming media service for one or more second audio tracks that are associated with second metadata matching the selected item of first metadata;
  displaying, on the graphical user interface of the streaming media service application, an indication of the one or more second audio tracks that are associated with second metadata matching the selected item of first metadata;
  receiving, via the graphical user interface of the streaming media service application, input data indicating a selection of at least one second audio track from among the one or more second audio tracks; and
  generating a container that includes the selected at least one second audio track.

12. The method of claim 11, wherein generating the container that includes the selected at least one second audio track comprises seeding a new Internet radio station with the selected at least one second audio track.

13. The method of claim 11, wherein generating the container that includes the selected at least one second audio track comprises adding the selected at least one second audio track to a new playlist.

14. The method of claim 11, wherein generating the container that includes the selected at least one second audio track comprises adding the selected at least one second audio to a user library associated with the particular user account of the streaming media service.

15. The method of claim 11, wherein the playback device is playing back the first audio track, and wherein the mobile device is not playing back the first audio track.

16. The method of claim 15, wherein the first audio track was selected for playback by the playback device on another mobile device.

17. The method of claim 15, wherein the method further comprises:
  receiving, via the graphical user interface of the streaming media service application, input data indicating a command to play back the selected at least one second audio track; and
  causing the playback device to play back the selected at least one second audio track, wherein causing the playback device to play back the selected at least one second audio track comprises sending, via a network interface of the mobile device, a command that causes the playback device to stream the selected at least one second audio track from the streaming media service.

18. The method of claim 11, wherein the first metadata is indicative of one or more of the following: (a) artist name of the first audio track, (b) track title of the first audio track, (c) album name of the first audio track, (d) genre of the first audio track, and (e) year of release of the first audio track, and wherein querying, via the network interface, one or more media servers of a streaming media service for one or more second audio tracks that are associated with second metadata matching the selected item of first metadata comprises querying the one or more media servers of the streaming media service for one or more second audio tracks that are associated with second metadata having the same (a) artist name, (b) track title, (c) album name, (d) genre, or (e) year of release as the first audio track.

19. A mobile device comprising:
  a graphical display;
  one or more processors;
  a network interface;
  data storage; and
  instructions stored in the data storage and executable by the one or more processors to perform a method comprising:
  receiving, via the network interface from one or more servers of a streaming media service, data representing first metadata that is associated with a first audio track that is being played back via a playback device, wherein the playback device and the mobile device are connected via a local area network;
  displaying, via the graphical display on a graphical user interface of a streaming media service application, the first metadata that is associated with the first audio track that is being rendered, wherein a particular user account of the streaming media service is associated with the streaming media service application;
  while the first audio track is being played back via the playback device, receiving, via the graphical user interface of the streaming media service application displayed on the mobile device, input data indicating a selection of an item of the first metadata from among the displayed first metadata that is associated with the first audio track being rendered;
  querying, via the network interface, one or more media servers of a streaming media service for one or more second audio tracks that are associated with second metadata matching the selected item of first metadata;
  displaying, via the graphical display on the graphical user interface of the streaming media service application, an indication of the one or more second audio tracks that are associated with second metadata matching the selected item of first metadata;

receiving, via the graphical user interface of the streaming media service application, input data indicating a selection of at least one second audio track from among the one or more second audio tracks; and generating a container that includes the selected at least one second audio track.

20. The mobile device of claim 19, wherein generating the container that includes the selected at least one second audio track comprises seeding a new Internet radio station with the selected at least one second audio track or adding the selected at least one second audio track to a new playlist.

* * * * *